United States Patent
Chemmengath et al.

(10) Patent No.: US 12,411,875 B2
(45) Date of Patent: Sep. 9, 2025

(54) RETRIEVAL AWARE QUESTION GENERATION

(71) Applicant: International Business Machines Corporation, Armonk, NY (US)

(72) Inventors: Saneem Ahmed Chemmengath, Bangalore (IN); Vishwajeet Kumar, Bangalore (IN); Jaydeep Sen, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 18/143,724

(22) Filed: May 5, 2023

(65) Prior Publication Data

US 2024/0370471 A1    Nov. 7, 2024

(51) Int. Cl.
G06F 16/3329     (2025.01)
G06F 16/332      (2025.01)
G06F 40/30       (2020.01)

(52) U.S. Cl.
CPC ...... G06F 16/3329 (2019.01); G06F 16/3325 (2019.01); G06F 40/30 (2020.01)

(58) Field of Classification Search
CPC ... G06F 16/3325; G06F 16/3329; G06F 40/30
See application file for complete search history.

(56) References Cited

U.S. PATENT DOCUMENTS

| | | | |
|---|---|---|---|
| 6,636,848 B1* | 10/2003 | Aridor | G06F 16/9538 707/999.005 |
| 9,342,796 B1* | 5/2016 | Mcclintock | G06N 5/02 |
| 10,002,177 B1* | 6/2018 | Mcclintock | G06F 16/24575 |
| 2011/0125734 A1 | 5/2011 | Duboue et al. | |
| 2011/0264656 A1* | 10/2011 | Dumais | G06F 16/9537 707/765 |
| 2015/0039536 A1* | 2/2015 | Cook | G06F 16/24575 706/11 |
| 2024/0143925 A1* | 5/2024 | Zarrouk | G06Q 30/016 |

(Continued)

OTHER PUBLICATIONS

Eunsol Choi et. al. "Decontextualization: Making Sentences Stand-Alone," Transactions of the Association for Computational Linguistics, vol. 9, pp. 447-461, Apr. 2021.

(Continued)

*Primary Examiner* — Eric Yen
(74) *Attorney, Agent, or Firm* — Kristofer Haggerty

(57) ABSTRACT

Retrieval aware natural language question generation for open domain document retrieval is provided. In one aspect, a system for retrieval aware question generation includes: a question decontextualizer configured to decontextualize a question generated from a context of a target document by adding terms from the context into the question itself to create a decontextualized question, where the decontextualized question alone enables open domain document retrieval without a need for also providing the context. The system can also include a detect document identifier configured to find the terms in the context; and a retriever configured to retrieve documents from the corpus of documents using the decontextualized question. A method for retrieval aware question generation using the present system is also provided.

20 Claims, 5 Drawing Sheets

(56) References Cited

U.S. PATENT DOCUMENTS

2024/0144920 A1* 5/2024 Zarrouk ............... G06N 20/20
2024/0362286 A1* 10/2024 He ...................... G06F 16/93

OTHER PUBLICATIONS

Saneem A. Chemmengath et al., "Topic Transferable Table Question Answering," Proceedings of the 2021 Conference on Empirical Methods in Natural Language Processing, pp. 4159-4172 (Nov. 2021).

Saichandra Pandraju et al., "Answer-Aware Question Generation from Tabular and Textual Data using T5," International Journal of Emerging Technologies in Leaning, vol. 16, No. 18, pp. 256-267, Sep. 2021.

Liuyin Wang et al., "Answer-driven Deep Question Generation based on Reinforcement Learning," Proceedings of the 28th International Conference on Computational Linguistics, pp. 5159-5170 (Dec. 2020).

Onur Keklik et al., "Rule-Based Automatic Question Generation Using Semantic Role Labeling," IEICE Transactions on Information and Systems, vol. E102-D, No. 7, pp. 1362-1373 (Jul. 2019).

Ye Liu et al., "Generative Question Refinement with Deep Reinforcement Learning in Retrieval-based QA System," arXiv:1908.05604v3 (Oct. 2019) (10 pages).

Manas Gaur et al., "ISEEQ: Information Seeking Question Generation using Dynamic Meta-Information Retrieval and Knowledge Graphs," arXiv:2112.07622v1 (Dec. 2021) (9 pages).

Woon Sang Cho et al., "Contrastive Multi-document Question Generation," arXiv:1911.03047v3 (May 2021) (19 pages).

Ji Ma et al., "Zero-shot Neural Passage Retrieval via Domain-targeted Synthetic Question Generation," Proceedings of the 16th Conference of the European Chapter of the Association for Computational Linguistics, pp. 1075-1088 (Apr. 2021).

* cited by examiner

20

2021 list [edit]

In 2021, the ten largest companies as calculated by this method were:

2021 Top ten

| Rank | | Industry | Sales (billion $) | Profit (billion $) | Assets (billion $) | Market value (billion $) |
|---|---|---|---|---|---|---|
| 1 | Company A | Banking, financial Service | 190.5 | 45.8 | 4914.7 | 249.5 |
| 2 | Company B | Banking, financial Service | 136.2 | 40.4 | 3689.3 | 464.8 |

But similar tables are available for 2020, 2019, . . .

22

2020 list [edit]

In 2020, the ten largest companies as calculated by this method were:

2020 Top ten

| Rank | | Industry | Sales (billion $) | Profit (billion $) | Assets (billion $) | Market value (billion $) |
|---|---|---|---|---|---|---|
| 1 | Company A | Banking, financial Service | 177.2 | 45.3 | 4322.5 | 242.3 |
| 2 | Company C | Banking, financial Service | 162.1 | 38.9 | 3822 | 203.8 |

FIG. 2

RETRIEVAL AWARE QUESTION GENERATION

FIELD OF THE INVENTION

The present invention relates to machine learning-based natural language question generation, and more particularly, to retrieval aware natural language question generation for open domain document retrieval.

BACKGROUND OF THE INVENTION

Machine learning-based question generation seeks to provide natural language questions for some given content, whereby the answers to the questions are found in the given content. Machine learning-based question generation is useful for a variety of different applications.

For instance, machine learning-based question generation is one of the techniques widely used for self-supervised training of different question answering-based information retrieval applications. Conventional question answering models typically take a question and content such as a document as input, and provide select content from the document as an answer to the question.

In that regard, machine learning-based question generation can thus be employed to generate the questions that are used to train the question answering models. However, in order to best train the question answering models, the questions generated by the machine learning-based question generation process need to be unambiguous and should retrieve a unique subset of the documents. Namely, effective training questions should more or less be specific to a small shared subset, rather than many of the documents in a given corpus. No means for achieving this goal exist in the current state of the art approaches.

Therefore, techniques for retrieval aware machine learning-based question generation for retrieving a relevant subset of documents from a corpus, even when the corpus of documents is unknown, would be desirable.

SUMMARY OF THE INVENTION

The present invention provides retrieval aware natural language question generation for open domain document retrieval. In one aspect of the invention, a system for retrieval aware question generation is provided. The system includes: a question decontextualizer configured to decontextualize a question generated from a context of a target document by adding terms from the context into the question itself to create a decontextualized question, where the decontextualized question alone enables open domain document retrieval without a need for also providing the context.

In another aspect of the invention, another system for retrieval aware question generation is provided. The system includes: a question decontextualizer configured to decontextualize a question generated from a context of a target document by adding terms from the context into the question itself to create a decontextualized question, where the terms uniquely identify the target document from a corpus of documents such that the decontextualized question alone enables open domain document retrieval without a need for also providing the context; a detect document identifier configured to find the terms in the context; and a retriever configured to retrieve documents from the corpus of documents using the decontextualized question, and to provide retriever feedback to the detect document identifier as to whether the decontextualized question is a valid retrieval aware question.

In yet another aspect of the invention, a method for retrieval aware question generation is provided. The method includes: decontextualizing a question generated from a context of a target document by adding terms from the context into the question itself to create a decontextualized question, where the decontextualized question alone enables open domain document retrieval without a need for also providing the context.

A more complete understanding of the present invention, as well as further features and advantages of the present invention, will be obtained by reference to the following detailed description and drawings.

BRIEF DESCRIPTION OF THE DRAWINGS

FIG. 2 is a diagram illustrating an exemplary question answering scenario where changing from a closed domain to an open domain requires the capabilities of the present retrieval aware question generation according to an embodiment of the present invention;

DETAILED DESCRIPTION OF PREFERRED EMBODIMENTS

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
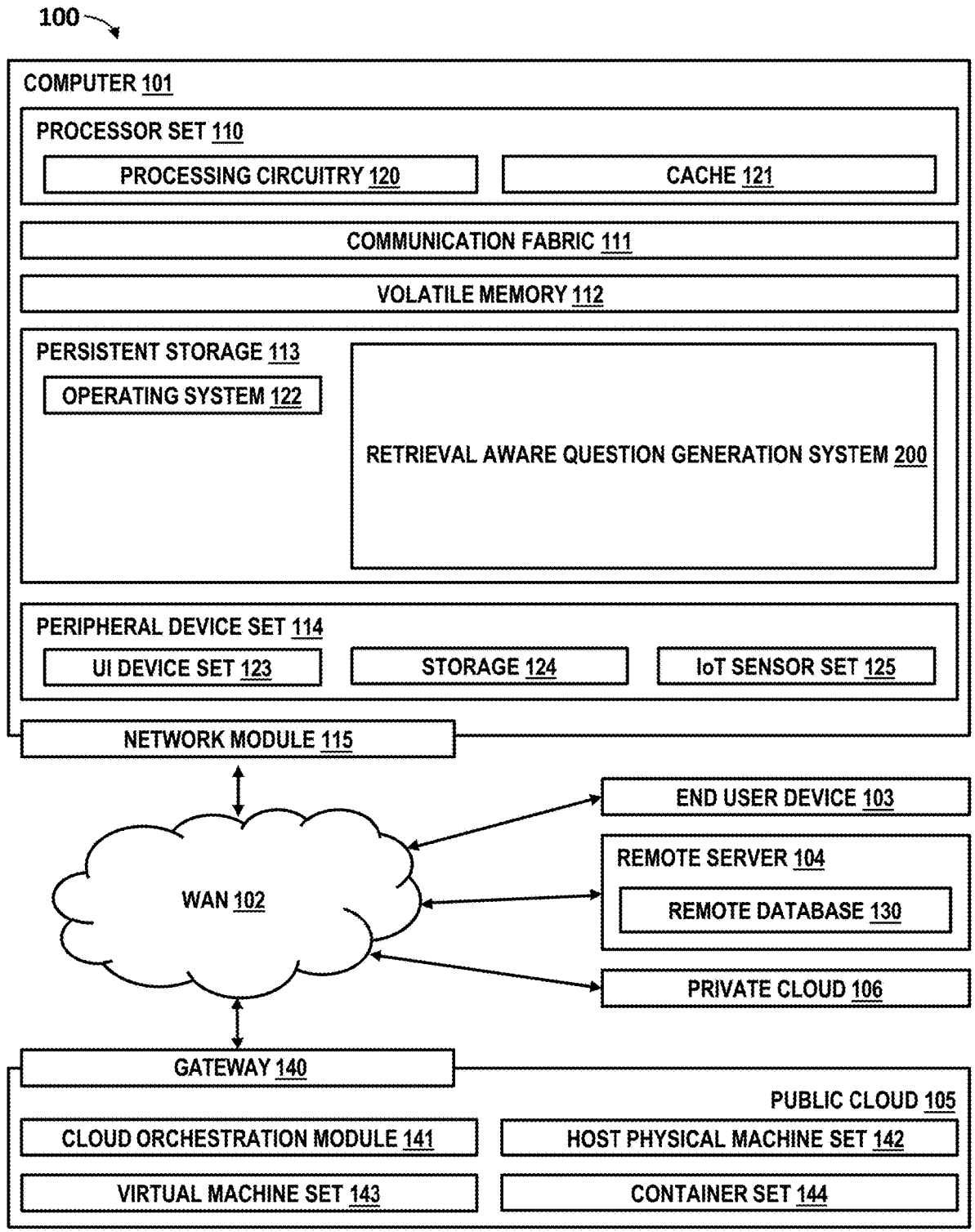
FIG. 1 is a diagram illustrating an exemplary computing environment according to an embodiment of the present invention.

Referring to FIG. 1, computing environment 100 contains an example of an environment for the execution of at least some of the computer code involved in performing the inventive methods, such as retrieval aware question generation system 200. In addition to system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in system 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in system 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way. EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As provided above, machine learning-based question generation is one of the techniques widely used for self-supervised training of different question answering-based information retrieval applications. To be most effective, the questions need to be unambiguous such that they retrieve a small shared subset of the documents (e.g., from 1 to 3 documents) from a given corpus, rather than many documents (e.g., more than 3 documents). This is what is referred to herein as 'retrieval aware' or 'retrieval awareness' in question generation. Namely, the present techniques uniquely address the task of question generation from a retrieval perspective, where the goal is to generate a specific-enough (i.e., unambiguous) question that retrieves a meaningfully small number of documents from the corpus. To look at it another way, with more ambiguity in the question (as is the case with conventional approaches), the less specific the search of the corpus becomes, and thus effectively limiting conventional approaches to closed domain applications. The term 'document' as used herein generally refers to any piece of written, printed, electronic or otherwise recorded matter including, but not limited to, text such as that appearing in an article, a publication, on a website and/or any portion(s) thereof (e.g., paragraph), an arrangement of text such as in a table, graph and/or chart, and/or images.

Advantageously, as will be described in detail below, the present retrieval aware techniques can be applied in open domain scenarios. The term 'open domain' as used herein refers to a situation where the system does not know the document from where the answer will come from, i.e., the system is not provided with the document as input. In that case, the system has to first retrieve the relevant document(s), and then answer the questions by seeing the (retrieved) document(s). Accordingly, the questions cannot be open-ended, but rather must be pointed enough that they are specific for retrieving certain kinds of documents. Otherwise, if the questions are ambiguous in nature such that the same question can be answered from many different documents, they are ineffective for open domain retrieval.

Advantageously, constructing a system having these retrieval awareness requirements enables existing closed domain datasets to be turned into an open domain dataset via domain adaptation. With a closed domain dataset, both the question and the document on which question answering is being attempted need to be given. There are many such datasets. By comparison, open domain question answering can work with documents from an unseen domain which, as highlighted above, requires first retrieving the relevant document(s), and then answer the questions by seeing the (retrieved) document(s). Doing so requires domain adaptation where a process trained on one domain can be applied to another, different (unseen) domain. An open domain set-up provides a practical approach for question answering scenarios where it is not known which document(s) can answer a particular query. Only open domain datasets help in retriever training.

Advantageously, the present system 200 generates specific, decontextualized questions through the use of retrieval awareness that can be used to effectively train question answering systems for open domain datasets. Namely, generating an unambiguous question with the present retrieval aware techniques becomes more conducive to doing a related document search and then answering the question. By comparison, the conventional open-ended questions employed in a closed domain are not particularly helpful in that regard, since they would result in the retrieval of such a large number of documents from a corpus that question answering performed on these large number of documents becomes essentially ineffective in producing a viable answer.

Namely, as will be described in detail below, provided herein is a unique system 200 and techniques for use thereof which provide a retrieval aware architecture that can aid in information retrieval in open domain question answering training, whereas previous approaches have always been closed answering meaning that, as provided above, the document on which question answering is attempted has to also be given. Specifically, the present system 200 embodies the notion of retrieval awareness via a unique Detect Document Identifier, a Question decontextualizer and Retriever (see below) that all work in concert to generate questions for question answering training in a feasible way that enables open domain retrieval.

Notably, domain adaptation when changing a domain (i.e., from a closed domain to an open domain) needs training data on that new domain. It is very challenging to obtain that training data with the correct annotations needed to do self-supervised generation. Advantageously, the present retrieval aware question generation approach enables open domain question answering capabilities. Further applications of the present techniques contemplated herein include, but are not limited to, query completion/suggestion. With query completion/suggestion, when a user begins typing a query into a field such as the search field of a web-based search engine, a recommender will make suggestions which, if accepted by the user, are then implemented to autocomplete the field. Query completion helps users frame better queries that are more likely to return helpful results. Query completion also helps users type less, thereby expediting the process. For instance, a user can be presented with questions/queries that are similar to the one the user is asking. Since these questions/queries have precomputed answers (e.g., based on the above-described open domain question answering capabilities), this will save compute time and also reduce the error rate.

An example is provided in FIG. 2 which helps illustrate why the present retrieval aware question generation is an important tool for open domain adaptation. In this example, the documents include tables from published annual rankings of public companies. If the task is to generate a question over only Table 20 in a closed book answering scenario where Table 20 is given, it makes sense to ask something like 'What is the sales in billions of Company A?' because there is a single row in Table 20 that talks about Company A and one can readily determine that 190.5 is the answer. However, suppose one changes to an open domain set-up, which is the more natural set of data in most cases and which, in the present example, includes documents in addition to Table 20 (such as Table 22 and similar tables (not shown) for other years, e.g., 2019, 2018, etc.). The same question 'What is the sales in billions of Company A?' will then apply to multiple tables, i.e., Table 20, Table 22, etc. As such, in the open domain, this question is not unambiguous enough to know which table the question is referencing. This means that the question does not have enough specificity to learn about the retrieval because each document/table becomes equally likely to provide the answer. In other words, in this open domain scenario, no reason exists to pick one document/table over another to use in providing an answer to this (ambiguous) question.

Accordingly, retrieval awareness is needed in question generation for open domain applications. Namely, without retrieval awareness, questions generated without also considering the process from the perspective of document retrieval performance (i.e., retrieval awareness) on a corpus of (unseen) documents are not useful for open domain question answering. Case in point, the exemplary question provided above is too ambiguous to effectively retrieve the table needed to answer it.

Figures 3, 4:
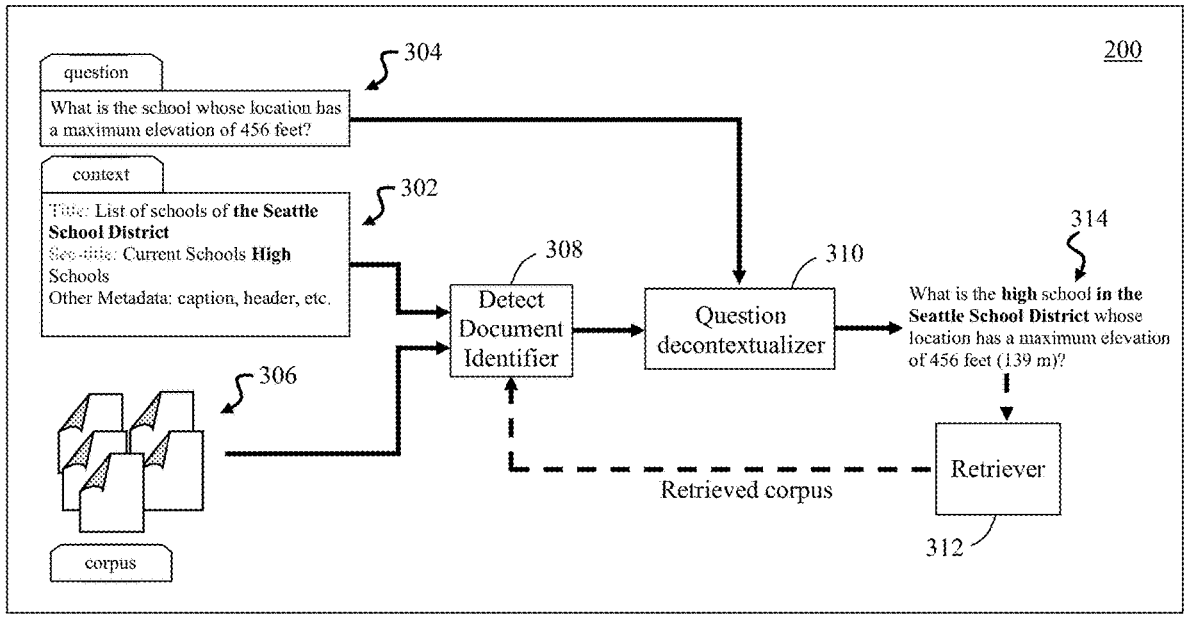
FIG. 3 is a diagram illustrating an exemplary system for retrieval aware question generation according to an embodiment of the present invention.
FIG. 4 is an example illustrating the use of metadata to decontextualize questions according to an embodiment of the present invention.

Given the above overview, FIG. 3 is a diagram illustrating an exemplary configuration of system 200 in accordance with the present techniques. As shown in FIG. 3, system 200 takes as input i) a given context 302 from a target document in a corpus 306 and ii) a closed domain question 304 generated from the given context 302. By way of example only, this preliminary closed domain question 304 can be generated using a standard context-only-question generator. As its name implies, a context-only-question generator is a sequence-to-sequence question generator that takes context as an input, and generates a question as an output.

This preliminary closed domain question 304 is, however, not unambiguous enough for use in open domain question answering. For instance, in the present example, given the context 302 from a document, i.e., Title: List of schools in the Seattle School District. Section title (Sec-title): Current Schools High Schools, and Other Metadata such as caption, header, etc., a context-only-question generator might come up with a question like 'What is the school whose location has a maximum elevation of 456 feet?' where 'a maximum elevation of 456 feet' is a part of the table/document for which the question was generated. Given the corpus 306 of documents, this closed domain question 304 would not be specific enough to provide a reason for picking one document over another from the corpus 306 to use in providing an answer to this (ambiguous) question.

Advantageously, system 200 provides a unique architecture for introducing retrieval awareness into the question generation process that enables effective open domain question answering not seen in conventional approaches. Namely, as shown in FIG. 3, system 200 has a novel combination of components including a Detect Document Identifier 308, a Question decontextualizer 310 and a document Retriever 312 that work together to extend the query to open domain retrieval by decontextualizing the (initially) closed domain question 304 with an eye towards being able to retrieve a unique set of documents from the corpus 306 (see 'Retrieved corpus') that are meaningful in composing an answer to the now decontextualized question 314. For instance, as will be described in detail below, embodiments are contemplated herein where the Retrieved corpus is required to include a predetermined threshold number of documents or less in order for the decontextualized question 314 to be considered sufficiently unambiguous for open domain retrieval and thus considered a valid retrieval aware question.

An overall goal of system 200 is to ensure that the decontextualized question 314 retrieves one or only a small number of documents from the corpus 306 (i.e., retrieval awareness). To do so, the Detect Document Identifier 308, the Question decontextualizer 310 and the document Retriever 312 all work in concert to decontextualize the closed domain question 304. By 'decontextualize' it is meant that system 200 crafts a (natural language) question in a way that eliminates the need for providing a context along with the question. According to an exemplary embodiment, this is done by adding terms to the question such that the presence of a context becomes unnecessary. Namely, the decontextualized question 314 generated by system 200 can alone be used for open domain document retrieval without the need for also providing the associated context 302.

Take, for instance, closed domain question 304: 'What is the school whose location has a maximum elevation of 456 feet?' and decontextualized question 314: 'What is the high school in the Seattle School District whose location has a maximum elevation of 456 feet?' In addition to the closed domain question 304, the context 302 also needs to be given for (closed domain) retrieval. Namely, closed domain question 304 is open-ended, e.g., as to what type of school and where, is being queried. In contrast, with the decontextualized question 314, adding the terms 'high' and 'in the Seattle School District' before and after the term 'school' respectively to the closed domain question 304 decontextualizes the closed domain question 304 by making the need for providing context outside of the decontextualized question 314 unnecessary. Adding these extra terms to identify the particular table/document helps in retrieval. For instance, simply given the decontextualized question 314 itself, it is now discernible that the question is directed to 'high schools' that are 'in the Seattle School District.' Thus, the decontextualized question 314 is not open-ended like the closed domain question 304 and, as such, can effectively be employed for open domain retrieval through this adaptation to the open domain.

As shown in FIG. 3, this task of generating decontextualized question 314 begins with the Detect Document Identifier 308 finding terms in the context 302 metadata that uniquely identify a document or a few (e.g., 3 or less) select documents in the corpus 306. A document identifier for machine learning-based information retrieval is generally any information in a document that can be used to uniquely identify that document within a collection or corpus of documents. For instance, document identifiers can include, but are not limited to, text or other metadata that start the beginning of the document and/or different sections within the document such as the title, title of a particular section or sections within the document (Sec-title), captions, i.e., words or phrases placed next to (and describing) something being shown like a picture, chart, graph, table, etc., and/or headers like those over a chart, graph, table, etc.

Notably, the function of the Detect Document Identifier 308 is to find terms from the context 302 metadata that uniquely identify the target document in the corpus 306. It is these terms that will be leveraged to decontextualize the question. Any information retrieval algorithm which captures relevant identifying terms from the documents in a corpus may be used as the Detect Document Identifier 308 in accordance with the present techniques. For instance, such an algorithm can try different subsets of keywords taken from the context metadata, and then verify whether any subset in particular can uniquely retrieve a document. If it can, then that set of keywords is provided by the Detect Document Identifier 308 as the identifying terms to use in decontextualizing the question.

These terms detected by Detect Document Identifier 308 are then provided to the Question decontextualizer 310 along with the closed domain question 304. Question decontextualizer 310 inserts these terms into the closed domain question 304 to generate the decontextualized question 314. These additional terms help to ground the decontextualized question 314 in one or a small group of documents in the corpus 306. Namely, as compared to the initial closed domain question 304, the decontextualized question 314 is no longer open ended. Doing so will ensure that this document (or small group of documents) gets the highest signal possible when the decontextualized question 314 is later used to retrieve (see below) this/these document(s) from the corpus 306.

It is further notable that the Question decontextualizer 310 model is trained to leverage these additional terms in a manner such that the resulting decontextualized question 314 makes sense as a natural language question. In other words, the Question decontextualizer 310 cannot just simply insert the terms anywhere in the closed domain question 304, but rather must learn where this metadata such as title, section title, etc. can be properly placed. For instance, using the decontextualized question 314 in this example as an illustration, the Question decontextualizer 310 makes a knowledgeable choice to insert the adjective 'high' before 'school,' and to place the qualifier 'in the Seattle School District' after 'school.' This capability is important in order to be able to generate a question that makes sense. An exemplary learning paradigm that enables this intelligent question generation will be described in detail below.

According to an exemplary embodiment the Question decontextualizer 310 is embodied in a pre-trained sequence-to-sequence generator machine learning model such as a Text-to-Text Transfer Transformer based architecture. As its name implies, with a Text-to-Text Transfer Transformer each task involves feeding text as input to the model and training the model to generate target text, such as a natural language question or answer. As will be described in detail below, the Text-to-Text Transfer Transformer can be trained on closed domain and open domain datasets to create decontextualized questions using the above-described metadata.

The decontextualized question 314 is provided to the retriever 312 which then attempts to retrieve documents from the corpus 306 based on the decontextualized question 314. Any suitable retrieval function may be used in accordance with the present techniques. For instance, a document retriever in question answering can be implemented using a bag-of-words retrieval function that matches key words in the question with those in the documents. This enables the documents that may contain the answer to the decontextualized question 314 to be retrieved from the corpus 306. As shown in FIG. 3, embodiments are contemplated herein where system 200 implements Retriever 312 feedback to the Detect Document Identifier 308. The notion behind the Retriever 312 feedback is that it enables expansion of the decontextualized question 314, if need be, based on a (predetermined) retrieval threshold to ensure that the decontextualized question 314 is specific enough to retrieve less than or equal to the threshold number of documents from the corpus 306. Remember, the goal is to enable open domain retrieval. Open ended questions which result in the retrieval of a large number of documents are of no real use in open domain retrieval. Implementing a threshold helps to place a boundary on the retrieval results. Namely, if the threshold is crossed (meaning that more than the threshold number of documents are retrieved), then the decontextualized question 314 can be modified with the goal of determining which terms in the decontextualized question 314 are the differentiating search terms. For instance, by way of example only, the retrieval threshold may be set at 3 documents. In that case, when 3 documents or less are retrieved from the corpus 306, the decontextualized question 314 is assumed to be a specific enough retrieval aware question. However, if more than 3 documents are retrieved, the Detect Document Identifier 308 can be used to expand on the terms used in the decontextualized question 314 until the decontextualized question retrieves the target document.

An example illustrating the use of metadata to decontextualize questions in accordance with the present techniques is now described by way of reference to FIG. 4. In this example, a table 400 and its associated metadata such as page title, section title, etc. is shown in FIG. 4. It is notable that a table is merely being used for illustrative purposes. Namely, as provided above, the present techniques are more generally applicable to any type of document, whether it be one or more pages of text, a chart, a graph, a table, etc. The notion here is to leverage the surrounding context of the document (in this case table 400) when trying to decontextualize the question. Namely, in this example, the associated metadata from the table 400 is considered by Detect Document Identifier 308 when adding/inserting terms into the 'Original' (closed domain) question 402 in order to decontextualize the question. Doing so makes the question sensitive to these identifying (metadata) tokens, which will help in identifying the table 400 during subsequent retrieval (see above) using the decontextualized question. For instance, one term from the metadata used in the present example is the page title of table 400. Namely, the term 'Netherlands' is inserted before 'competitor' in the decontextualized question 404, where this metadata is gleaned from the title of the page containing table 400, i.e., 'Netherlands at the European Track Championships,' that clarifies which 'European Track Championship' or ETC location the question is referring to. Other terms from the associated metadata used to decontextualize the question in this example also come from the section title, i.e., 'European Track Championships 2010-current,' that clarifies what competition (ETC) and what time period (after 2010) the question is referring to. The goal is to make question 404 specific enough so that it can be determined from the question 404 itself, of all of the documents/tables in corpus 306, which table in particular the question 404 is referring to. This example assumes that table 400 is part of a given document, and appears on a particular page of the document entitled 'Netherlands at the European Track Championships,' within the section entitled 'European Track Championships 2010-current.' The present system 200 learns to generate this decontextualized question 404, and the learning depends on some smaller set of annotated questions.

As highlighted above, these additional terms must be added to decontextualize the question 404 in a manner that makes sense as a natural language question. An exemplary learning paradigm will be described in detail below which trains the Question decontextualizer 310 to follow natural language grammatical and semantical rules. This natural language processing implemented by the trained Question decontextualizer 310 model will enable system 200 to produce a 'naturalized' question 406 that makes sense as a natural language question. Advantageously, decontextualizing the question in the present manner will enable adaptation of the question generation process to open domain retrieval applications such as open domain question answering (e.g., using datasets containing open questions which require retrieving tables and text from the web to answer the questions).

Figure 5:
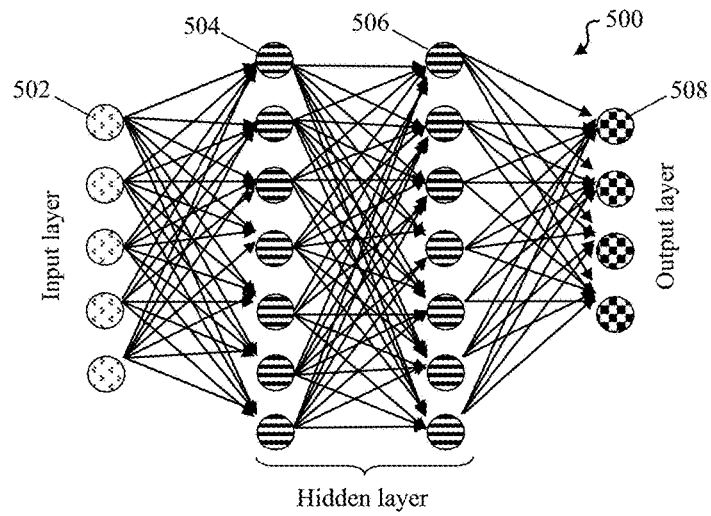
FIG. 5 is a diagram illustrating an exemplary neural network according to an embodiment of the present invention.

According to an exemplary embodiment, the Question decontextualizer 310 is embodied in a Text-to-Text Transfer Transformer model, which is a sequence-to-sequence generator. A sequence-to-sequence generator is a type of recurrent neural network (i.e., a neural network using sequential or time series data) that is often implemented for complex language tasks such as question answering. In general, a neural network (see, e.g., neural network 500 shown in FIG. 5) includes a plurality of interconnected processor elements 502, 504/506 and 508 that form an input layer, at least one hidden layer, and an output layer, respectively, of the neural network 500. The connections in neural networks that carry electronic messages between simulated neurons are provided with numeric weights that correspond to the strength or weakness of a given connection. These numeric weights can be adjusted and tuned based on experience, making neural networks adaptive to inputs and capable of learning. Typically, neural networks are trained on labeled sets of training data. Once trained, the neural network can be used for inference. Inference applies knowledge from a trained neural network model and uses it to infer a result. A fully connected layer (typically the last or last few layers in a neural network) is a layer where all of the inputs from one layer are connected to every activation unit of the next layer. The fully connected layer(s) compile the data extracted by previous layers of the neural network to form the final output.

Figure 6:
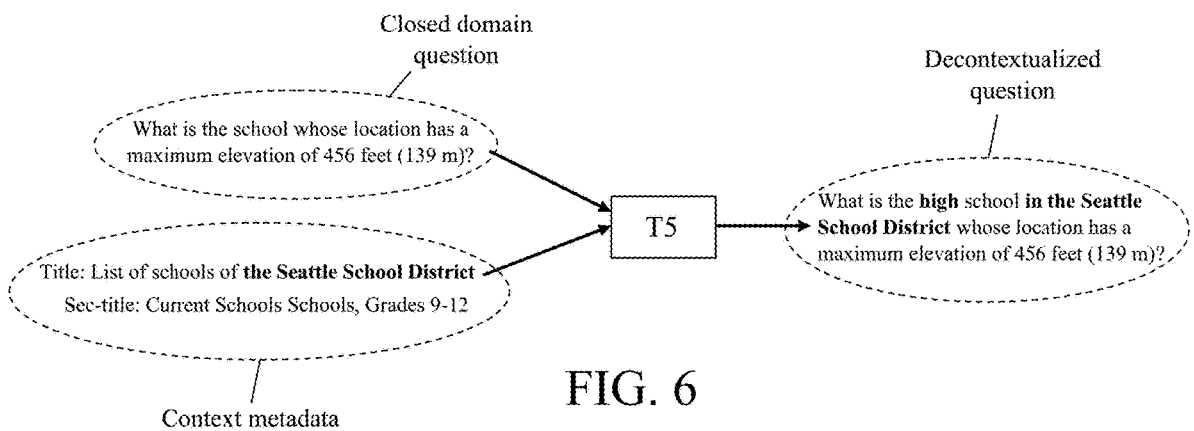
FIG. 6 is a diagram illustrating an exemplary implementation of a Text-to-Text Transfer Transformer model for generating a decontextualized question according to an embodiment of the present invention.

Referring specifically to FIG. 6, the Text-to-Text Transfer Transformer (aka 'T5') model is pre-trained using a (closed domain) question Q and associated context metadata from an available closed domain dataset, e.g., 'What is the school whose location has a maximum elevation of 456 feet (139 meters (m)?' and Title: 'List of schools of the Seattle School District'/Section-title (Sec-title) 'Current Schools High Schools, Grades 9-12,' respectively. For instance.

Input $I=\{CONTEXT\_Q|TITLE|SEC\text{-}TITLE \forall Q\ IN\ CLOSED\ DOMAIN\ DATASET\}$, where the Text-to-Text Transfer Transformer model is induced to concatenate the contextualized/closed domain question from the closed domain dataset and the title, section title from the section containing the relevant table, paragraph, etc. The goal during pre-training is to train the model to produce a decontextualized question in an available open domain dataset, e.g., 'What is the high school in the Seattle School District whose location has a maximum elevation of 456 feet (139 m)?' Notably, through this process the Text-to-Text Transfer Transformer model learns to add additional terms to the question (shown in bold) to decontextualize (decontext) the question by making the question itself specific enough for open domain retrieval, i.e., Output $O = \{DECONTEXT\_Q\ \forall\ IN\ OPEN\ DOMAIN\ DATASET\ SUCH\ THAT\ \{CONTEXT\_Q, CONTEXT\_Q\}\ IS\ PAIRED\}$ Advantageously, via this learning paradigm the Text-to-Text Transfer Transformer model learns which of the terms (words) from the title, section title, etc. can be used to decontextualize the question while still ensuring that the question generated is a meaningful question, i.e., it still makes sense as a natural language question. Such a learning paradigm is important because the final decontextualized question that is generated has to make sense as a natural language question, meaning that terms from the context metadata cannot be put just anywhere in the starting question. This is why the Text-to-Text Transfer Transformer model is trained to place the adjective 'high' before 'school' and the particular qualifier 'in the Seattle School District' after 'school.' This capability is learned through the above-described learning paradigm which gets the model to see the title, section title, etc. metadata and learn how to produce a meaningful decontextualized question.

Once trained, the Text-to-Text Transfer Transformer model can then be implemented as the Question decontextualizer 310 in system 200 and, for any input I (any closed domain question and associated context metadata), generate an output O (a decontextualized natural language question). It is notable, however, that use of a Text-to-Text Transfer Transformer model is only one of the models contemplated herein for performing these functions. Namely, any machine learning process that can be trained to decontextualize a question in the manner described herein may be used in accordance with the present techniques.

As provided above, embodiments are also contemplated herein where feedback from the Retriever 312 is used as a post-processing step to modify/fine-tune the decontextualized question in order to meet a predefined retrieval threshold. Doing so will ensure that the final decontextualized question generated is specific enough for effective open domain retrieval in that it effects retrieval of the threshold number of documents or less. To look at it another way, if a generated question is still ambiguous enough that it results in the retrieval of many documents from the corpus 306 (i.e., more than the threshold number of documents), then it is less likely that the correct answer will be found in the retrieved documents. By further refining the question based on this retrieval awareness feedback, system 200 can ensure that only the most relevant document(s) is/are retrieved.

The notion behind this retriever feedback feature of system 200 is to look at the search space after the question generation, and to keep trying different queries until a particular document or set of documents is identified. The use of a threshold provides a metric for analyzing this search space and determining whether the question generated is specific enough. According to an exemplary, non-limiting embodiment, the threshold of 3 documents is implemented. This means that if the decontextualized question retrieves 2, 3 or even a single document from the corpus 306, then the decontextualized question is considered to be specific enough for open domain retrieval. However, on the other hand, if the decontextualized question retrieves 4 or more documents from the corpus 306, then further inquiry is needed into what the differentiating terms in these (retrieved) documents may be. In other words, the terms added to the question may not yet be sufficient enough to permit the question to differentiate amongst the documents in the corpus 306, and refinements of the question are made until the decontextualized question retrieves the target document.

Figure 7:
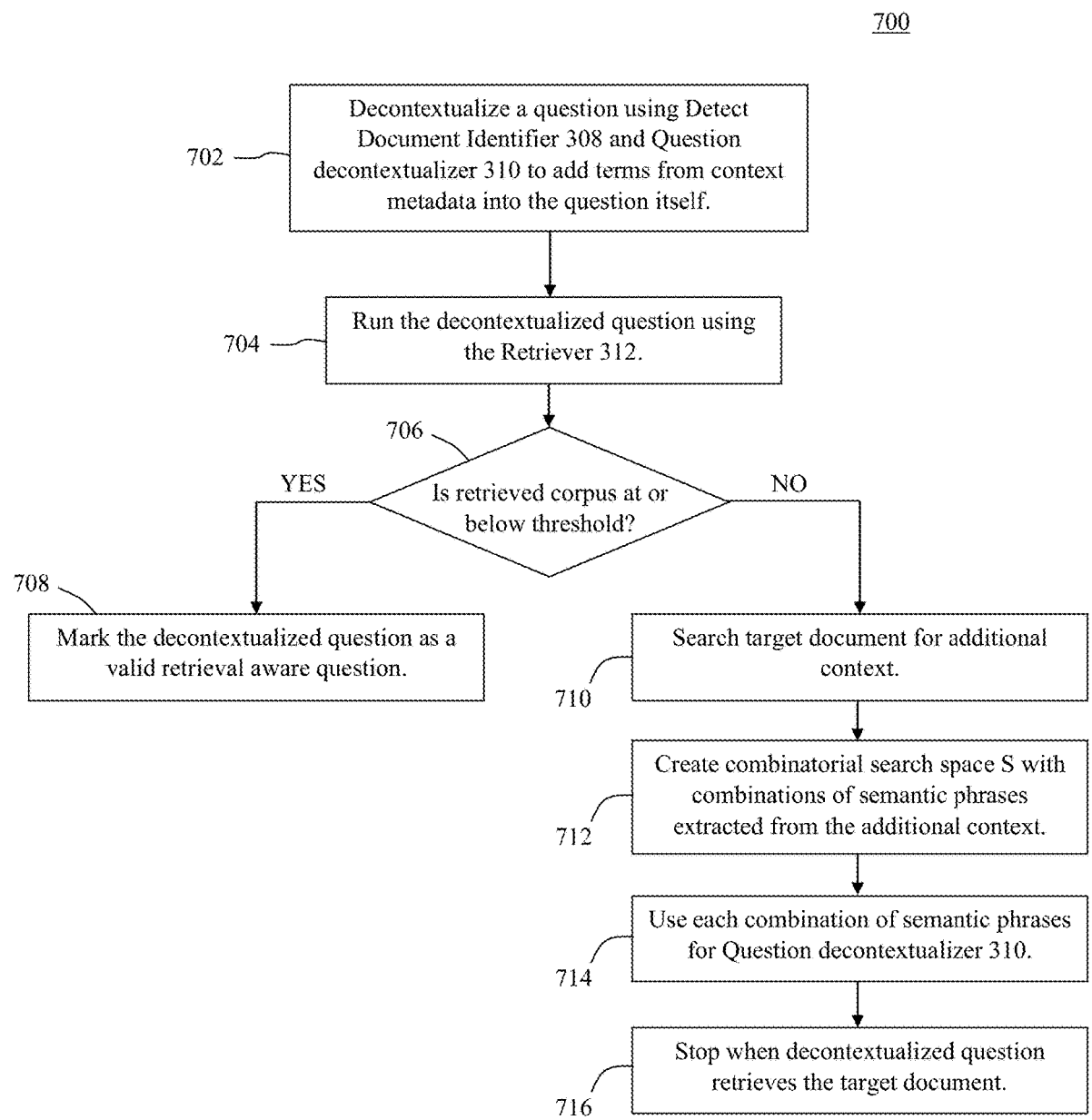
FIG. 7 is a diagram illustrating an exemplary methodology for retrieval aware question generation using the present system which includes optional retriever feedback for determining whether the decontextualized question is a valid retrieval aware question according to an embodiment of the present invention.

An exemplary methodology 700 for retrieval aware question generation which includes this optional retriever feedback for (decontextualized) question refinement is now described by way of reference to FIG. 7. As described in detail above, the process begins with the context 302 of a target document in the corpus 306 and a closed domain question 304. In step 702, the Detect Document Identifier 308 finds terms in context 302 metadata that uniquely identify the target document, and the Question decontextualizer 310 adds those terms to the closed domain question 304 itself thereby generating a decontextualized question 314. The goal is for the decontextualized question 314 alone to be specific enough that it enables open domain document retrieval without a need for also providing the context 302.

In step 704, the decontextualized question is then run by the Retriever 312 to retrieve documents from the corpus 306 (i.e., a retrieved corpus). To begin the optional retriever feedback evaluation, a determination is made by the Detect Document Identifier 308 in step 706 as to whether the retrieved corpus is at or below the (predetermined) threshold. In other words, was a threshold number of documents or less retrieved in step 704? If it is determined in step 706 that, YES, the threshold number of documents (or fewer) were retrieved in step 704 using the decontextualized question 314, then in step 708 the decontextualized question 314 is marked as being a valid retrieval aware question. In that case, the inquiry ends there. Using the above example where a threshold of 3 documents is implemented, if 2, 3, or even a single document is retrieved in step 704, then it is assumed that the decontextualized question 314 is a valid retrieval aware question.

On the other hand, if it determined in step 706 that, NO, the retrieved corpus is not at or below the (predetermined) threshold, meaning that more than the threshold number of documents was retrieved in step 704, then further refinement is needed to produce a valid retrieval aware question. Namely, in step 710 the Detect Document Identifier 308 is used to search the target document for additional context metadata such as table headers, captions, section titles, etc. For instance, if metadata from the title and section title were not specific enough to produce a valid retrieval aware question, then additional context metadata from table headers and/or captions might help. As provided above, this can involve the Detect Document Identifier 308 trying different subsets of keywords taken from the context metadata, and then verifying whether any subset in particular can uniquely retrieve a document. If a set of keywords can uniquely retrieve a document, then it is used to decontextualize the question. For example, according to an exemplary embodiment, in step 712, the Detect Document Identifier 308 is used to create a combinatorial search space S containing combinations of semantic phrases extracted from the additional context which are potential document identifiers. These combinations of semantic phrases combine conceptually related terms from the additional context metadata, such as 'in ETC after 2010' to use an example from above. The Detect Document Identifier 308 then searches through this set of semantic phrases to verify and obtain those unique keywords/combination of semantic phrases which can be treated as a document identifier.

In step 714, each of these combinations of semantic phrases is used by Question decontextualizer 310 to create (modified) decontextualized questions that are then run by the Retriever 312. According to an exemplary embodiment, step 714 is iterated with each combination of semantic phrases until, in step 716, a respective one of the (modified) decontextualized questions retrieves only the target document.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A system for retrieval aware question generation, the system comprising:
   a processor set;
   one or more computer-readable storage media; and
   program instructions stored on the one or more computer-readable storage media to cause the processor set to perform operations comprising:
   decontextualizing a question generated from a context of a target document by adding terms from the context into the question itself to create a decontextualized question, wherein the decontextualized question alone enables open domain document retrieval without a need for also providing the context.

2. The system of claim 1, wherein the decontextualized question is a natural language question.

3. The system of claim 1, wherein the terms are taken from metadata selected from the group consisting of: document title, document section title, captions, headers, and combinations thereof.

4. The system of claim 1, wherein the decontextualizing is performed using a text-to-text transfer transformer model.

5. The system of claim 1, wherein the operations further comprise:
   finding the terms in the context, wherein the terms uniquely identify the target document from a corpus of documents.

6. The system of claim 5, wherein the operations further comprise:
   retrieving documents from the corpus of documents using the decontextualized question.

7. A system for retrieval aware question generation, the system comprising:
   a processor set;
   one or more computer-readable storage media; and
   program instructions stored on the one or more computer-readable storage media to cause the processor set to perform operations comprising:
   decontextualizing a question generated from a context of a target document by adding terms from the context into the question itself to create a decontextualized question, wherein the terms uniquely identify the target document from a corpus of documents such that the decontextualized question alone enables open domain document retrieval without a need for also providing the context;
   finding the terms in the context; and
   retrieving documents from the corpus of documents using the decontextualized question, and providing feedback as to whether the decontextualized question is a valid retrieval aware question.

8. The system of claim 7, wherein the decontextualized question is a natural language question.

9. The system of claim 7, wherein the terms are taken from metadata selected from the group consisting of: document title, document section title, captions, headers, and combinations thereof.

10. The system of claim 7, wherein the decontextualizing is performed using a text-to-text transfer transformer model.

11. The system of claim 7, wherein the operations further comprise:
    determining whether a threshold number of documents or less is retrieved from the corpus of documents using the decontextualized question; and
    modifying the decontextualized question when more than the threshold number of documents is retrieved from the corpus of documents using the decontextualized question.

12. The system of claim 11, wherein the decontextualized question is a valid retrieval aware question when the threshold number of documents or less is retrieved from the corpus of documents using the decontextualized question.

13. The system of claim 12, wherein the operations further comprise:

modifying the decontextualized question by searching the target document for additional context and creating a combinatorial search space with combinations of semantic phrases extracted from the additional context, wherein the decontextualizing uses each of the combinations of semantic phrases to create modified decontextualized questions until one of the modified decontextualized questions retrieves only the target document.

14. A method for retrieval aware question generation, comprising:

decontextualizing a question generated from a context of a target document by adding terms from the context into the question itself to create a decontextualized question, wherein the decontextualized question alone enables open domain document retrieval without a need for also providing the context.

15. The method of claim 14, wherein the decontextualized question is a natural language question.

16. The method of claim 14, wherein the terms are taken from metadata selected from the group consisting of: document title, document section title, captions, headers, and combinations thereof.

17. The method of claim 14, further comprising:

finding the terms in the context, wherein the terms uniquely identify the target document from a corpus of documents.

18. The method of claim 17, further comprising:

retrieving documents from the corpus of documents using the decontextualized question.

19. The method of claim 18, further comprising:

determining whether a threshold number of documents or less is retrieved from the corpus of documents using the decontextualized question; and modifying the decontextualized question when more than the threshold number of documents is retrieved from the corpus of documents using the decontextualized question.

20. The method of claim 19, wherein the modifying comprises:

searching the target document for additional context;

creating a combinatorial search space with combinations of semantic phrases extracted from the additional context; and using each of the combinations of semantic phrases to create modified decontextualized questions until one of the modified decontextualized questions retrieves only the target document.

* * * * *